United States Patent
Burnett et al.

(10) Patent No.: US 11,299,632 B2
(45) Date of Patent: Apr. 12, 2022

(54) ROAD MAKING MATERIAL, A METHOD OF PRODUCING A ROAD MAKING MATERIAL AND A ROAD MADE THEREFROM

(71) Applicant: Macrebur Limited, Scotland (GB)

(72) Inventors: Nicholas Peter Burnett, Lockerbie (GB); Gordon Michael Reid, Lockerbie (GB); Toby Jon McCartney, Lockerbie (GB)

(73) Assignee: Macrebur Limited, Scotland (GB)

( * ) Notice: Subject to any disclaimer, the term of this patent is extended or adjusted under 35 U.S.C. 154(b) by 1 day.

(21) Appl. No.: 16/763,055

(22) PCT Filed: Nov. 12, 2018

(86) PCT No.: PCT/EP2018/080982
§ 371 (c)(1),
(2) Date: May 11, 2020

(87) PCT Pub. No.: WO2019/092254
PCT Pub. Date: May 16, 2019

(65) Prior Publication Data
US 2020/0392342 A1 Dec. 17, 2020

(30) Foreign Application Priority Data
Nov. 13, 2017 (GB) ..................... 1718706

(51) Int. Cl.
*C08L 95/00* (2006.01)
*E01C 7/22* (2006.01)
*E01C 7/26* (2006.01)

(52) U.S. Cl.
CPC ............. *C08L 95/00* (2013.01); *E01C 7/22* (2013.01); *E01C 7/26* (2013.01); *C08L 2207/062* (2013.01); *C08L 2207/066* (2013.01); *C08L 2555/22* (2013.01); *C08L 2555/86* (2013.01)

(58) Field of Classification Search
CPC ...................................................... C08L 95/00
See application file for complete search history.

(56) References Cited

U.S. PATENT DOCUMENTS

| | | | |
|---|---|---|---|
| 5,360,848 | A | 11/1994 | Kuechler et al. |
| 2009/0163625 | A1 | 6/2009 | Lang et al. |
| 2014/0186116 | A1 | 7/2014 | Hacker |
| 2014/0261078 | A1 | 9/2014 | Morriss |

FOREIGN PATENT DOCUMENTS

| | | |
|---|---|---|
| CA | 2 800 435 A1 | 6/2014 |
| CH | 545 832 A | 2/1974 |
| NL | 9 201 765 A | 5/1994 |
| WO | 2017199013 A1 | 11/2017 |

OTHER PUBLICATIONS

Allen, Glen Keith, "Problems of Stone Mastic Asphalt Use in North Queensland (Thesis)", Nov. 1, 2006.
Angelone, et al., "Green Pavements: Reuse of Plastic Waste in Asphalt Mixtures", Materials and Structures, London, GB, vol. 49, No. 5, pp. 1655-1665, Mar. 22, 2015.
Anonymous, "Engineering Road Note 10, Stone Mastic Asphalt", May 1, 2016.
Anonymous, "European Standard En 13108-1:2006, Bituminous Mixtures-Materials Specifications-Part 1: Asphalt Concrete", pp. 1-41, May 1, 2006.
Anonymous, "Hampshire Highways, Surfacing Options & Guidance; 2016 Edition", pp. 1-59, Mar. 2, 2016.
Anonymous, "Specification for Stone Mastic Asphalt Surface Course", pp. 1-10, Nov. 1, 2013.
Anonymous, TS2010 Surface Course Specification and Guidance (Transport Scotland Interim Amendment No. 35-15, pp. 1-42, Oct. 1, 2015.
Brown, et al., "Designing Stone Matrix Asphalt Mixtures for Rut-Resistant Pavements (Report 425)", pp. 1-82, Jan. 1, 1999.
Butz, et al., "Binder and Asphalt Designs for Heavy Duty Pavements—Case Studies", pp. 1-10, Oct. 16, 2012.
Hunter, et al., "The Shell Bitumen Handbook, Sixth Edition" ICE Publishing, Jan. 1, 2015.
Jensen, et al., "15 Years Experience Adding Polymer Power Directly Into the Asphalt Mixer", 5th Eurasphalt & Eurobitume Congress, pp. 1-8, Jun. 15, 2012.
Modarres, et al., "Effect of Waste Plastic Bottles on the Stiffness and Fatigue Properties of Modified Asphalt Mixes", Materials and Design, vol. 61, pp. 8-15, Sep. 1, 2014.
Nielsen, et al., "Opthinal Optimization of Thin Asphalt Layers (Final Report)", pp. 1-82, Mar. 1, 2011.
Rahman, et al., "Green Pavement Using Recycled Polyethylene Terephthalate (PET) as Partial Fine Aggregate Replacement in Modified Asphalt", Procedia Engineering, vol. 53, Jan. 1, 2013.
Sultana, et al., "Utilization of Waste Plastic as a Strength Modifier in Surface Course of Flexible and Rigid Pavements", International Journal of Engineering Research and Applications (IJERA), vol. 2, No. 4, pp. 1185-1191, Aug. 1, 2012.

(Continued)

*Primary Examiner* — Arrie L Reuther
(74) *Attorney, Agent, or Firm* — Greenberg Traurig, LLP; David J. Dykeman; Roman Fayerberg

(57) ABSTRACT

The present invention relates to a road making material comprising aggregate, bitumen, and a plastics material, wherein: (a) when the road making material is 10 mm stone mastic asphalt, the bitumen comprises at least 4.7% but no more than 5.69% by weight of the aggregate, bitumen, and plastics material mix; (b) when the road making material is 6 mm, 10 mm, or 20 mm asphaltic concrete, the bitumen comprises at least 3.1% but no more than 4.09% by weight of the aggregate, bitumen, and plastics material mix; (c) when the road making material is hot rolled asphalt, the bitumen comprises at least 4.9% but no more than 5.89% by weight of the aggregate, bitumen, and plastics material mix; or (d) when the road making material is heavy duty 32 mm, the bitumen comprises at least 2.4% but no more than 3.39% by weight of the aggregate, bitumen, and plastics material mix.

15 Claims, No Drawings

(56) References Cited

OTHER PUBLICATIONS

Wong, et al., "Utilization of Waste Plastics in Stone Mastic Asphalt for Infrastructural Applications", Materials Science Forum, vol. 902, pp. 55-59, Jul. 1, 2017.

Zoorob, et al., "Laboratory Design and Investigation of the Properties of Continuously Graded Asphaltic Concrete Containing Recycled Plastics Aggregate Replacement (Plastiphalt)", Cement and Concrete Composites, vol. 22, No. 4, pp. 233-242, Jan. 1, 2000.

International Search Report in PCT/EP2018/080982 dated Feb. 11, 2019.

ROAD MAKING MATERIAL, A METHOD OF PRODUCING A ROAD MAKING MATERIAL AND A ROAD MADE THEREFROM

This application is a U.S. national phase application of PCT International Patent Application No. PCT/EP2018/080982, filed on Nov. 12, 2018, which claims the benefit of and priority to GB patent application no. 1718706.3, filed Nov. 13, 2017, and both applications are hereby incorporated by reference in their entireties.

This invention relates to a road making material comprising aggregate, bitumen, and a plastics material, and a method of producing a road making material and to a road made therefrom.

Materials for making roads, sometimes called pavements in some jurisdictions, include stone, aggregate and bitumen. The term "road" used herein includes within its scope pedestrian paths (known as pavements, or sidewalks in some countries) or cycle paths.

The term "asphalt" is used herein to refer to the combination of aggregate and bitumen. Generally there is 95% aggregate in asphalt although this varies depending on the performance required.

Bitumen is a sticky black and highly viscous liquid or semi-solid form of petroleum and may be found in natural deposits or may be refined. Asphalt generally comprises aggregate with a mesh size of up to about 3 cm. Aggregate is generally heated to a temperature of 150° C.-250° C. and mixed in a plant with bitumen. The resulting compound is taken to a roadway where it is poured into a laying machine and applied to a road surface, whereupon it is rolled before the mixture cools. Such road surfaces are susceptible to being permeated by rain water and for the surface to break up leaving potholes which are damaging to vehicle tyres, wheels and suspensions, and which can cause severe accidents.

Current bitumen compound suffers from temperature effects, oxidation leading to cracking and crazing, and rutting reducing the life of roads, and relatively high cost in needing to repair or resurface a road on a regular basis.

To alleviate these issues the asphalt industry has invested significant resources to develop polymer modified bitumen (PMB). PMB products contain virgin polymers which are mechanically sheared into the bitumen. The resultant mix of bitumen and polymers is then transported in liquid form to asphalt plants before mixing with aggregate to produce asphalt. PMB is expensive, it cannot be stored indefinitely, and it requires specialist heated storage units. This creates issues of wastage with unused material having to be disposed of or used when not required.

This invention seeks to utilise plastics, such as waste plastics, e.g. HDPE and LDPE, to partially replace bitumen in an asphalt mix, unlike existing PMB-type asphalts wherein aggregate is replaced in the asphalt mix, and to produce an improved road making material and an improved road produced therefrom.

The invention also seeks to provide asphalt plants with the means to store polymers for long periods, preferably indefinitely, at ambient temperatures, allowing them to make a PMB-type asphalt without many of the disadvantages of PMB.

Additionally, the invention requires no additional equipment at an asphalt plant to produce the product, making the overall production costs of high strength material cheaper and more efficient.

Replacing bitumen rather than aggregate in the asphalt mix also reduces the cost of raw materials whilst maintaining the performance advantages of PMB. Reduction in bitumen use is also desirable as bitumen is an unsustainable (i.e. finite) resource.

In one aspect, the invention provides a method of producing a road making material comprising:
1. Heating aggregate;
2. Heating bitumen;
3. Mixing the heated aggregate and bitumen;
4. Adding a plastics material to the aggregate and bitumen mixture; and
5. Mixing to incorporate the plastics with the aggregate and bitumen.

In one aspect, the aggregate is heated to 130° C.–180° C. Preferably the aggregate is heated to 140-170° C., such as 150-170° C., such as 160-170° C., such as 160° C., 161° C., 162° C., 163° C., 164° C., 165° C., 166° C., 167° C., 168° C., 169° C., or 170° C.

In one aspect, the bitumen is heated to 130° C.–180° C. Preferably the bitumen is heated to 140-170° C., such as 150-170° C., such as 160-170° C., such as 160° C., 161° C., 162° C., 163° C., 164° C., 165° C., 166° C., 167° C., 168° C., 169° C., or 170° C.

Common polymer plastics, such as waste plastics, that may be used in the present invention include low density polyethylene (LDPE), used for bags, sacks, bin liners, squeezable detergent bottles etc.; high density polyethylene (HDPE), used for bottles for various liquids, among other things; polyvinyl butyral (PVB) is used to laminate and toughen glass, among other things; and styrene isoprene styrene (SIS) is used for adhesives and sealants, etc. Currently, such plastics materials are used in virtually every sector of the economy from agriculture to packaging, automobile and building construction, and communications equipment. Such plastics material is non-biodegradable and can remain stable for as long as 4,500 years. The majority of this material is either landfilled or burned in incinerators across the globe, in some cases despite significant efforts to recycle. Burning plastic materials has been shown to release gases which are dangerous to the environment.

In one preferred embodiment the plastics material is recovered or waste plastic, or a blend of waste or recovered plastic, and may comprise more than one type of plastics materials. A recovered plastics material is therefore one which is not a virgin or unused plastics material. For the avoidance of doubt, virgin/unused plastics are equally applicable for use in the invention, which allows the reduction in use of bitumen.

Preferably the plastics material is not a 'virgin' or unused plastic material.

In one aspect the plastics material may be a blend comprising high density polyethylene (HDPE) and low density polyethylene (LDPE). Preferably the ratio of HDPE to LDPE is 1:1 by weight in the blend. Preferably the blend comprises 50% HDPE by weight and 50% LDPE by weight, and no other plastics materials are present in the blend.

In one aspect the plastics material may be polyvinyl butyral (PVB). Preferably 100% PVB is used, and no other plastics material are present.

In one aspect the plastics material may be styrene isoprene styrene (SIS). Preferably 100% SIS is used, and no other plastics materials are present.

Preferably, the plastics material is at ambient temperature when added to the aggregate and bitumen mixture.

In one aspect, before mixing with aggregate and bitumen, the plastics material is heated to a temperature of 120° C.-180° C., preferably 130-170° C., such as 140-170° C., such as 160-170° C., e.g. 160° C., 161° C., 162° C., 163° C., 164° C., 165° C., 166° C., 167° C., 168° C., 169°, or 170° C. It has been found that plastics soften at 120° C. and there is no gas evolution in the range 120° C.-180° C.

In one embodiment the aggregate has a mesh size of 1 mm-55 mm. Preferably the aggregate has a mesh size of 5 mm-35 mm or 5 mm-20 mm. Preferably the aggregate has a mesh size of 10 mm, 11 mm, 12 mm, 13 mm, 14 mm, 15 mm, 16 mm, 17 mm, 18 mm, 19 mm, or 20 mm.

In one aspect, the constituents are mixed for at least 30 seconds, at least 35 seconds, or at least 40 seconds. Preferably the constituents are mixed for at least 45 seconds.

In one aspect, no other materials are added to the mix, and the road making material consists of aggregate, bitumen and a plastics material.

Preferably, the amount of bitumen used is reduced by the weight of the plastics material added when compared to the amount of bitumen used in production of comparable standard products.

For example, when the road making material is 10 mm stone mastic asphalt, according to the present invention the bitumen can comprise 4.7% by weight of the aggregate, bitumen, and plastics material mix, compared to 5.7% by weight of the aggregate, bitumen, and plastics material mix in standard 10 mm stone mastic asphalt. Preferably the bitumen content is between 4.7% and up to, but not including, 5.7% by weight of the aggregate, bitumen, and plastics material mix in standard 10 mm stone mastic asphalt, such as 4.8%, 4.9%, 5%, 5.1%, 5.2%, 5.3%, 5.4%, 5.5% or 5.6% by weight. In one aspect the bitumen comprises 5.4% by weight of the aggregate, bitumen, and plastics material mix.

In another example, when the road making material is 6 mm, 10 mm and 20 mm asphaltic concrete according to the present invention the bitumen can comprise 3.1% by weight of the aggregate, bitumen, and v mix, compared to 4.1% by weight of the aggregate, bitumen, and plastics material mix in standard 6 mm, 10 mm and 20 mm asphaltic concrete. Preferably the bitumen content is between 3.1% and up to, but not including, 4.1% by weight of the aggregate, bitumen, and plastics material mix in standard 6 mm, 10 mm and 20 mm asphaltic concrete, such as 3.2%, 3.3%, 3.4%, 3.5%, 3.6%, 3.7%, 3.8%, 3.9% and 4%, by weight. In one aspect the bitumen comprises 3.8% by weight of the aggregate, bitumen, and plastics material mix.

In another example, when the road making material is hot rolled asphalt according to the present invention the bitumen can comprise 4.9% by weight of the aggregate, bitumen, and plastics material mix, compared to 5.9% by weight of the aggregate, bitumen, and plastics material mix in standard hot rolled asphalt. Preferably the bitumen content is between 4.9% and up to, but not including, 5.9% by weight of the aggregate, bitumen, and plastics material mix in standard hot rolled asphalt, such as 5.0%, 5.1%, 5.2%, 5.3%, 5.4%, 5.5% 5.6%, 5.7% and 5.8% by weight. In one aspect the bitumen comprises 5.6% by weight of the aggregate, bitumen, and plastics material mix.

In another example, when the road making material is heavy duty 32 mm, according to the present invention the bitumen can comprise 2.4% by weight of the aggregate, bitumen, and plastics material mix, compared to 3.4% by weight of the aggregate, bitumen, and plastics material mix in heavy duty 32 mm. Preferably the bitumen content is between 2.4% and up to, but not including, 3.4% by weight of the aggregate, bitumen, and plastics material mix in standard heavy duty 32 mm, such as 2.5%, 2.6%, 2.7%, 2.8%, 2.9%, 3% 3.1%, 3.2% and 3.3% by weight. In one aspect the bitumen comprises 3.1% by weight of the aggregate, bitumen, and plastics material mix.

The standards for all asphalt on public roads in the UK and Europe are covered by the Series 900 standards and BS EN 13108:—Bituminous mixtures, material, specifications.

The method may also be applied to any asphalt in the Series 900 and BS EN (British Standards European Norm) 13108, including:
  BS EN 13108-1 Asphalt concrete (including 6 mm, 10 mm and 20 mm, 32 mm);
  BS EN 13108-2 Asphalt concrete for thin layers (including 6 mm, 10 mm and 20 mm, 32 mm);
  BS EN 13108-3 Soft asphalt;
  BS EN 13108-4 Hot rolled asphalt; (HRA)
  BS EN 13108-5 Stone mastic asphalt; (SMA)
  BS EN 13108-6 Mastic asphalt;
  BS EN 13108-7 Porous asphalt;
  BS EN 13108-8 Reclaimed asphalt;
  BS EN 13108-20 Type testing;
  BS EN 13108-21 Factory production control.

The method may also be applied to any asphalt in the GOST 9128.

The method may also be applied to any asphalt in the standards provided by the American Association of State Highway and Transportation Officials (AASHTO).

In one embodiment, the amount of bitumen used is reduced by the weight of the plastics material added when compared to the amount of bitumen used in the standard products according to the British Series 900 standards, BS EN 13108, GOST9128, or standards provided by the American Association of State Highway and Transportation Officials (AASHTO). In one aspect, the amount of bitumen is reduced by up to 10%, such as reduced by up to 9%, 8%, 7%, 6%, 5%, 4%, or 3% when compared to the amount of bitumen used in the standard products according to the BS EN 13108, GOST9128, or standards provided by the American Association of State Highway and Transportation Officials (AASHTO). In one aspect, the weight of bitumen per tonne of asphalt is reduced by 3 kg when compared to the weight of bitumen present in the standard products according to the BS EN 13108, GOST9128, or standards provided by the American Association of State Highway and Transportation Officials (AASHTO). In one aspect the bitumen is replaced by plastics materials, such as those disclosed herein, preferably in an equal amount by weight. In one aspect the amount of aggregate in these standards is not reduced even when the amount of bitumen is reduced.

In one aspect the invention relates to relates to a road making material comprising, consisting essentially of, or consisting of, bitumen, aggregate and a plastics material, such as a recovered plastics material.

In one aspect the invention relates to a road making material comprising, consisting essentially of, or consisting of, bitumen, aggregate and a plastics material, such as a recovered plastics material, wherein the aggregate forms at least 95% by weight of the road making material or at least 95% by weight of the combined weight of the aggregate, bitumen, and plastics material.

In one aspect the invention relates to a road making material comprising no more than 4.99% bitumen by weight of the road making material, or by weight of the combined weight of the bitumen, aggregate and plastics material, such as no more than 4.9%, 4.8% and preferably no more than 4.7% bitumen by weight.

The aggregate, bitumen, and plastics material may have any of the properties described herein. The plastics material of the road making material may comprise high density polyethylene (HDPE) and low density polyethylene (LDPE), or may comprise polyvinyl butyral (PVB), or may comprise styrene isoprene styrene (SIS), or combinations thereof.

The road making material may comprise aggregate, bitumen, and a plastics material, wherein:

(a) when the road making material is 10 mm stone mastic asphalt, the bitumen comprises at least 4.7% but no more than 5.69% by weight of the aggregate, bitumen, and plastics material mix;

(b) when the road making material is 6 mm, 10 mm, or 20 mm asphaltic concrete, the bitumen comprises at least 3.1% but no more than 4.09% by weight of the aggregate, bitumen, and plastics material mix;

(c) when the road making material is hot rolled asphalt, the bitumen comprises at least 4.9% but no more than 5.89% by weight of the aggregate, bitumen, and plastics material mix; or (d) when the road making material is heavy duty 32 mm, the bitumen comprises at least 2.4% but no more than 3.39% by weight of the aggregate, bitumen, and plastics material mix.

The road making material may comprise aggregate, bitumen, and a plastics material, wherein:

(a) when the road making material is 10 mm stone mastic asphalt, the bitumen comprises at least 5.4% but no more than 5.69% by weight of the aggregate, bitumen, and plastics material mix;

(b) when the road making material is 20 mm asphaltic concrete, the bitumen comprises at least 3.8% but no more than 4.09% by weight of the aggregate, bitumen, and plastics material mix;

(c) when the road making material is hot rolled asphalt, the bitumen comprises at least 5.6% but no more than 5.89% by weight of the aggregate, bitumen, and plastics material mix; or (d) when the road making material is heavy duty 32 mm, the bitumen comprises at least 3.1% but no more than 3.39% by weight of the aggregate, bitumen, and plastics material mix.

These are non-limiting examples and a person skilled in the art would readily be able to apply the teaching of the present invention to any of the many varieties of asphalt produced globally.

In one aspect the road making material comprises bitumen, aggregate and a plastics material, wherein the aggregate forms at least 95% by weight of the road making material, or at least 95% by weight of the combined weight of the aggregate, bitumen, and plastics material mix.

In one aspect the road making material consists of, or consists essentially of, bitumen, aggregate and a recycled plastics material, and the aggregate forms at least 95% by weight of the road making material or at least 95% by weight of the combined weight of the aggregate, bitumen, and plastics material mix.

In other aspects the road making material may comprise at least 96% aggregate, at least 97% aggregate, 98% aggregate, 99% aggregate and at least 99.5% aggregate by weight of the road surface.

In other aspects the road making material may comprise at least 94% aggregate, at least 93% aggregate, 92% aggregate, 91% aggregate and at least 90% aggregate by weight of the road surface.

In one aspect the road making material comprises no more than 4.99% bitumen by weight of the road making material, or by weight of the combined weight of the bitumen, aggregate and plastics material, such as no more than 4.9%, 4.8% and preferably no more than 4.7% bitumen by weight.

Preferably the bitumen is at least 4% by weight of the road making material, or by weight of the combined weight of the bitumen, aggregate and plastics material, such as at least 4.1%, 4.2%, 4.3%, 4.4% or 4.5% or more.

The amount of the plastics material may be 0.1 kg to 10 kg present in each tonne of asphalt. Preferably the amount of plastics material is 2 kg-4 kg present in each tonne of asphalt. Preferably 3 kg of plastics material is present in each tonne of asphalt.

In one aspect, the bitumen content in the aggregate, bitumen, and plastics material mix is reduced by 0.3% by weight per tonne when compared to the minimum bitumen content of comparable standard products.

For example, when the road making material is 10 mm stone mastic asphalt, according to the present invention the bitumen can comprise 4.7% by weight of the aggregate, bitumen, and plastics material mix, compared to 5.7% by weight of the aggregate, bitumen, and plastics material mix in standard 10 mm stone mastic asphalt.

For example, when the road making material is 6 mm, 10 mm and 20 mm asphaltic concrete according to the present invention the bitumen can comprise 3.1% by weight of the aggregate, bitumen, and plastics material mix, compared to 4.1% by weight of the aggregate, bitumen, and plastics material mix in standard 10 mm stone mastic asphalt.

For example, when the road making material is hot rolled asphalt, according to the present invention the bitumen can comprise 4.9% by weight of the aggregate, bitumen, and plastics material mix, compared to 5.9% by weight of the aggregate, bitumen, and plastics material mix in standard 10 mm stone mastic asphalt.

For example, when the road making material is heavy duty 32 mm, according to the present invention the bitumen can comprise 2.4% by weight of the aggregate, bitumen, and plastics material mix, compared to 3.4% by weight of the aggregate, bitumen, and plastics material mix in standard 10 mm stone mastic asphalt.

We have demonstrated that the use of a plastics material can permit a reduction in bitumen without any detriment in the road material properties.

The invention therefore is also related to the use of a plastics material, preferably recycled or waste plastics, as a bitumen replacement, suitably in an amount of 0.1 to 10 kg per tonne of asphalt.

In one aspect, the ratio of bitumen to plastics material is 4:1 to 19:1 by weight, 9:1 to 19:1 by weight, or 9:1 to 24:1 by weight.

In one embodiment, the ratio of aggregate to bitumen is 19:1 by weight.

The invention also provides a road making material comprising 90%-99% aggregate by weight of the aggregate, bitumen, and plastics material mix. The road making material may further comprise 4.6%-4.99% bitumen by weight of the aggregate, bitumen, and plastics material mix. The road making material may further comprise 0.01%-0.4% plastics material by weight of the aggregate, bitumen, and plastics material mix. In one aspect, the road making material may comprise 95% aggregate, 4.7% bitumen, and 0.3% plastics material by weight of the aggregate, bitumen, and plastics material mix. The road making material may also comprise 95% aggregate, 4.99% bitumen, and 0.01% plastics material by weight of the aggregate, bitumen, and plastics material mix; 95% aggregate, 4% bitumen, and 1% plastics material by weight of the aggregate, bitumen, and plastics material mix; 95% aggregate, 4.6% bitumen, and 0.4% plastics material by weight of the aggregate, bitumen, and plastics material mix; or 95% aggregate, 4.8% bitumen, and 0.2% plastics material by weight of the aggregate, bitumen, and plastics material mix.

The invention also provides a road making material comprising 94.3% aggregate, 5.4% bitumen, and 0.3% plastics material by weight of the aggregate, bitumen, and plastics material mix. The road making material may also comprise 95.9% aggregate, 3.8% bitumen, and 0.3% plastics material by weight of the aggregate, bitumen, and plastics material mix; 94.1% aggregate, 5.6% bitumen, and 0.3% plastics material by weight of the aggregate, bitumen, and plastics material mix; 96.6% aggregate, 3.1% bitumen, and 0.3% plastics material by weight of the aggregate, bitumen, and plastics material mix.

In one aspect, the road making material consists of aggregate, bitumen, and plastics material only.

In one embodiment the grade of bitumen is one of 40/60, 60/70, 80/100, or 100/150.

In one embodiment, the aggregate comprises stone dust and lime.

Preferably, the plastics material may be HDPE, LDPE, or preferably a blend of HDPE and LDPE. Such a blend may be produced using the following method:
1. Optionally cleaning and removing impurities in the HDPE and LDPE.
2. Reducing the size of the particles to up to 50 mm in diameter if the material is a substantially flat sheet, or to between 0.01 mm-15 mm in diameter otherwise. Preferably, the particle size will be 0.01 mm-10 mm in diameter. Particles are suitably sized in this way to allow the plastics materials to fully melt and integrate into the asphalt.
3. Mixing waste HDPE and LDPE.

Preferably, the blend will contain at least 30% of each of these components with a maximum of 40% of other plastics materials or contaminants. Preferably the blend is a 50:50 mix of HDPE and LDPE by weight.

Preferably, the plastics material may be PVB. Such a plastics material may be produced using the following method:
1. Removing 95% of the glass from the laminate in laminated glass, which comprises breaking the glass into small pieces and using screens to separate the PVB.
2. Weathering the PVB.
4. Drying the weathered PVB to remove 90% of the moisture.
5. Shredding or grinding the PVB to reduce the particle size to flakes with a diameter of up to 30 mm. Particles are suitably sized in this way to allow the plastics materials to fully melt and integrate into the asphalt.

Preferably PVB should be weathered for at least 6 months. Preferably, PVB should be weathered for 1 year. Preferably, the plastics material may be a blend comprising at least 60% PVB with a maximum of 40% of other plastics materials or contaminants. Preferably 100% PVB is produced.

Preferably, the plastics material may be SIS. Such a plastics material may be produced using the following method:
1. Optionally cleaning and removing impurities from SIS.
2. Reducing the size of the particles to up to 50 mm if the material is a substantially flat sheet, or to between 0.01 mm-15 mm otherwise. Preferably, the particle size will be 0.01 mm-10 mm Particles are suitably sized in this way to allow the plastics materials to fully melt and integrate into the asphalt.
3. Mixing waste SIS with other waste plastics as necessary.

Preferably, the plastics material may be a blend comprising at least 60% SIS with a maximum of 40% of other plastics materials or contaminants. Preferably 100% SIS is produced.

In another embodiment the plastics material may be a blend comprising HDPE, LDPE, PVB, and SIS. In another embodiment the blend comprises HDPE, LDPE, and PVB. In another embodiment the blend comprises HDPE, LDPE, and SIS. In another embodiment the blend comprises SIS and PVB.

In one aspect, the plastics material may comprise up to 10% by weight of one or any combination of polypropylene, polystyrene, polyvinylchloride, polycarbonate, or polyethylene terephthalate. Preferably the plastics material comprises no more than 5% by weight of one or any combination of polypropylene, polystyrene, polyvinylchloride, polycarbonate, or polyethylene terephthalate.

In one aspect, the plastics material may comprise any plastic that has a melting temperature between 90° C. and 180° C. Preferably the plastics material does not comprise any plastic that has a melting temperature higher than 180° C. Preferably the plastics material does not comprise any plastic that has a melting temperature lower than 90° C.

It will be understood that the plastics material melted with hot bitumen and aggregate forms an oily coat which is provided over aggregate and the resulting mixture of a compound is laid onto a road surface. Such a technology provides improved strength of road surface. When waste plastics are utilised, benefits to the environment are also forthcoming.

In one aspect the invention further provides a method for laying a road surface using any road making material comprising aggregate, bitumen, and a plastics material disclosed herein, such as wherein:
(a) when the road making material is 10 mm stone mastic asphalt, the bitumen comprises at least 4.7% but no more than 5.69% by weight of the aggregate, bitumen, and plastics material mix;
(b) when the road making material is 6 mm, 10 mm and 20 mm asphaltic concrete, the bitumen comprises at least 3.1% but no more than 4.09% by weight of the aggregate, bitumen, and plastics material mix;
(c) when the road making material is hot rolled asphalt, the bitumen comprises at least 4.9% but no more than 5.89% by weight of the aggregate, bitumen, and plastics material mix; or
(d) when the road making material is heavy duty 32 mm, the bitumen comprises at least 2.4% but no more than 3.39% by weight of the aggregate, bitumen, and plastics material mix, wherein the road is made by laying the road making material at a temperature of 70° C.-160° C. and subsequently rolling the material so that it is compacted, the rolling weight being up to approximately 10,160 kg (10 ton).

This invention preferably uses waste plastics that is collected from landfill sites, dumps, garbage trucks, school collection programmes, or by purchase from waste buyers/collectors, although it is to be understood that the improved road making material of this invention is not dependent upon the use of waste plastics since it is possible that plastics material from a chemical plant may be utilised.

Using plastics materials with bitumen to coat aggregate for a road making material has the following advantages over currently produced bitumised road surfaces:
1. A stronger road with increased tensile strength and resistance to rutting.

2. Enabling plants to produce high performance asphalts without the need for specific tanks and the associated issues with storage and use of PMB.
3. The use of waste plastics.
4. The reduction in the use of bitumen through replacement with plastics materials.
5. Improved fuel resistance.
6. Increased softening point.
7. Increased resistance to water sensitivity.

EXAMPLES

LDPE/HDPE Performance Table

Independent UKAS accredited tests were carried out on 3 standard products used in the United Kingdom. The products used were 20 mm asphaltic concrete (AC20), 10 mm Stone mastic asphalt (SMA) and Hot Rolled Asphalt (35 14 HRA). The tests shown are for a replacement of 6% of the bitumen content (equivalent to a reduction of 3 kg of bitumen per tonne of asphalt, and 3 kg of plastics material present per tonne of asphalt) with a plastics material blend comprising a 1:1 by weight blend of HDPE and LDPE.

| Material | Test | Control Result | Result with 6% replacement of bitumen with plastics material |
|---|---|---|---|
| AC20 | Stiffness (ITSM) | 7827 MPa | 11600 MPa |
| AC20 | Water sensitivity | 93.6% | 99.7% |
| AC20 | Wheel tracking | 3.6 mm | 1.5 mm |
| SMA | Stiffness (ITSM) | 1823 MPa | 5438 MPa |
| SMA | Water sensitivity | 94.8% | 99.5% |
| SMA | Wheel tracking | 3.1 mm | 1.3 mm |
| SMA | 4 Point bending | 100 | 143 |
| HRA | Stiffness (ITSM) | 3568 MPa | 4313 MPa |
| HRA | Wheel tracking | 2.8 mm | 1.2 mm |
| HRA | Marshall Flow | 1.7 | 2.1 |
| HRA | Marshall stability | 8.2 | 7.0 |

PVB Performance Table

Independent UKAS accredited tests were carried out on 2 standard products used in the United Kingdom. The products used were 20 mm asphaltic concrete (AC20) and 10 mm Stone mastic asphalt (SMA). The tests shown are for a replacement of 6% of the bitumen content (equivalent to a reduction of 3 kg of bitumen per tonne of asphalt, and 3 kg of plastics material present per tonne of asphalt) with 100% PVB plastics material.

| Material | Test | Control Result | Result with 6% replacement of bitumen with plastics material |
|---|---|---|---|
| AC20 | Stiffness (ITSM) | 7827 MPa | 9133 MPa |
| AC20 | Wheel tracking | 3.6 mm | 1.9 mm |
| SMA | Stiffness (ITSM) | 1823 MPa | 4539 MPa |
| SMA | Water sensitivity | 94.8% | 96% |
| SMA | Wheel tracking | 3.1 mm | 1.5 mm |
| SMA | 4 Point bending | 100 | 198 |

SIS Performance Table

Independent UKAS accredited tests were carried out on 2 standard products used in the United Kingdom. The products used were 20 mm asphaltic concrete (AC20) and 10 mm Stone mastic asphalt (SMA). The tests shown are for a replacement of 6% of the bitumen content (equivalent to a reduction of 3 kg of bitumen per tonne of asphalt, and 3 kg of plastics material present per tonne of asphalt) with 100% SIS plastics material.

| Material | Test | Control Result | Result with 6% replacement of bitumen with plastics material |
|---|---|---|---|
| AC20 | Stiffness (ITSM) | 7827 MPa | 10387 MPa |
| AC20 | Wheel tracking | 3.6 mm | 2.9 mm |
| SMA | Stiffness (ITSM) | 1823 MPa | 3746 MPa |
| SMA | Water sensitivity | 94.8% | 97.9% |
| SMA | Wheel tracking | 3.1 mm | 2.5 mm |
| SMA | 4 Point bending | 100 | 398 |

Comparative Data

The table below demonstrates the reduction in bitumen content that can be achieved by the present invention when compared to standard comparable products. These are non-limiting examples and a person skilled in the art would readily be able to apply the teaching of the present invention to any of the many varieties of asphalt produced globally.

| Product | Standard Minimum bitumen content possible (% by weight) | Minimum bitumen content possible with plastics material added (% by weight) |
|---|---|---|
| 10 mm Stone mastic asphalt | 5.7 | 4.7 |
| 20 mm Asphaltic concrete | 4.1 | 3.1 |
| Hot rolled asphalt 35 14 | 5.9 | 4.9 |
| Heavy duty 32 mm | 3.4 | 2.4 |

Plastics Material Tests

Several plastics materials were tested for their suitability for use in the present invention. Plastics materials were prepared wherein blends comprised at least 60% of the specified plastic material, and preferably 100% pure plastics materials were used (i.e. with no contaminant or other plastics). The plastics materials were then utilised in the method according to the invention. The table below shows five failures and reasons why these plastics materials are unsuitable for the present invention. HDPE, LDPE, PVB, and SIS have no such problems and were selected as being suitable for use in the present invention, and are individually preferred and can be used in combinations with one another.

Additionally, whilst the five plastics listed below were not suitable for the present invention when comprising at least 60% of the plastics material, the plastics listed below may comprise up to 10% by weight in total of the plastics material with no significant adverse effects.

| Products tested | Reason for failure |
|---|---|
| Polyvinyl chloride (PVC) | Recycled PVC has very high variability in melting point (from 100° C. to 260° C.) and there are multiple grades of recycled PVC available which means that guaranteeing full melt is difficult. |
| Polyethylene terephthalate (PET) | The melting point of recycled PET proved too high for asphalt production. |
| Polypropylene (PP) | When mixed with recycled polypropylene the asphalt became too dry and brittle meaning the resultant asphalt is difficult to lay and may not have longevity. |

-continued

| Products tested | Reason for failure |
|---|---|
| Polystyrene (PS) | There is a high variability of recycled polystyrene grades which means that consistency of product is difficult to guarantee. |
| Polycarbonate (PC) | Using recycled polycarbonate, a full melt is difficult to achieve at 160° C. degrees in asphalt mixing plant. |

The invention claimed is:

1. A method of producing a road making material comprising:
   (a) heating aggregate;
   (b) heating bitumen;
   (c) mixing aggregate and bitumen to form an aggregate and bitumen mixture;
   (d) adding a plastics material to the aggregate and bitumen mixture; and
   (e) mixing to incorporate the plastics material with the aggregate and bitumen;
   wherein the plastics material comprises high density polyethylene (HDPE) or low density polyethylene (LDPE);
   wherein:
   (a) the road making material is 10 mm stone mastic asphalt, the bitumen comprises at least 4.7% but no more than 5.69% by weight of the aggregate, bitumen, and plastics material mix;
   (b) the road making material is 6 mm, 10 mm, or 20 mm asphaltic concrete, the bitumen comprises at least 3.1% but no more than 4.09% by weight of the aggregate, bitumen, and plastics material mix;
   (c) the road making material is hot rolled asphalt, the bitumen comprises at least 4.9% but no more than 5.89% by weight of the aggregate, bitumen, and plastics material mix; or
   (d) the road making material is heavy duty 32 mm, the bitumen comprises at least 2.4% but no more than 3.39% by weight of the aggregate, bitumen, and plastics material mix.

2. The method of claim 1, wherein the aggregate is heated to 130° C.-180° C.

3. The method of claim 1, wherein the bitumen is heated to 130° C.-180° C.

4. The method of claim 1, wherein the aggregate is heated to 165° C.

5. The method of claim 1, wherein the bitumen is heated to 165° C.

6. The method of claim 1, wherein the plastics material is at ambient temperature when added to the aggregate and bitumen mixture.

7. The method of claim 1 further comprising, heating the plastics material to 120° C.-180° C. before mixing with aggregate and bitumen.

8. The method of claim 1, wherein the plastics material is heated to 165° C.

9. The method of claim 1, wherein the aggregate, bitumen, and plastics material are mixed for at least 30 seconds.

10. The method of claim 1, wherein the aggregate, bitumen, and plastics material are mixed for at least 45 seconds.

11. The method of claim 1, wherein the plastics material is a blend comprising high density polyethylene (HDPE) and low density polyethylene (LDPE).

12. The method of claim 11, wherein said blend comprises 50% high density polyethylene (HDPE) by weight and 50% low density polyethylene (LDPE) by weight, with no other plastics materials or contaminants present in the blend.

13. The method of claim 1, wherein the plastics material is a blend comprising polyvinyl butyral (PVB).

14. The method of claim 1, wherein the plastics material is a blend comprising styrene isoprene styrene (SIS).

15. The method of claim 1, wherein 3 kg of the plastics material is present per 1 tonne of roadmaking material.

* * * * *